United States Patent
K et al.

(10) Patent No.: US 10,300,770 B2
(45) Date of Patent: May 28, 2019

(54) DOOR BEAM FOR VEHICLE

(71) Applicants: Hyundai Motor Company, Seoul (KR); Kia Motors Corporation, Seoul (KR)

(72) Inventors: Naresh K, Hyderabad (IN); Si Yun Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/829,564

(22) Filed: Dec. 1, 2017

(65) Prior Publication Data

US 2019/0100085 A1 Apr. 4, 2019

(30) Foreign Application Priority Data

Sep. 29, 2017 (IN) .............................. 201711034790

(51) Int. Cl.
*B60J 5/04* (2006.01)
*F16F 1/06* (2006.01)

(52) U.S. Cl.
CPC .............. *B60J 5/0444* (2013.01); *B60J 5/044* (2013.01); *B60J 5/0437* (2013.01); *F16F 1/06* (2013.01)

(58) Field of Classification Search
CPC ................................ B60J 5/0444; B60J 5/044
USPC ...................................................... 296/146.6
See application file for complete search history.

(56) References Cited

U.S. PATENT DOCUMENTS

| 4,866,883 | A | * | 9/1989 | Brown | B60J 5/0416 49/502 |
|---|---|---|---|---|---|
| 5,203,436 | A | * | 4/1993 | Wieting | B60J 5/0447 296/146.6 |
| 6,039,387 | A | * | 3/2000 | Choi | B60J 5/0427 296/146.6 |
| 6,092,555 | A | * | 7/2000 | Otsuka | B60J 5/0443 138/118 |
| 6,382,707 | B1 | * | 5/2002 | Dunneback | B60J 5/0425 296/146.6 |
| 7,270,364 | B1 | * | 9/2007 | Kim | B60J 5/0433 296/146.6 |
| 10,112,463 | B2 | * | 10/2018 | Deng | B60J 5/0437 |
| 2008/0185850 | A1 | * | 8/2008 | Takaya | E05B 79/04 292/336.3 |
| 2008/0315619 | A1 | * | 12/2008 | Oka | B60J 5/0437 296/146.6 |
| 2009/0026795 | A1 | * | 1/2009 | Tate | B60J 5/0429 296/146.6 |
| 2012/0091750 | A1 | * | 4/2012 | Danaj | B60J 5/0437 296/146.6 |
| 2014/0132029 | A1 | * | 5/2014 | Kuroki | B60J 5/0429 296/146.6 |
| 2014/0375078 | A1 | * | 12/2014 | Fujihara | B60J 5/0443 296/146.6 |

(Continued)

*Primary Examiner* — Jason S Morrow
(74) *Attorney, Agent, or Firm* — Morgan, Lewis & Bockius LLP

(57) ABSTRACT

A door beam for a vehicle may include a beam portion having a rod shape which extends along a longitudinal direction of a vehicle body, a front mounting portion disposed at a front end portion of the beam portion to mount the front end portion of the beam portion to the door, and a rear mounting portion disposed at a rear end portion of the beam portion to mount the rear end portion of the beam portion to the door.

5 Claims, 5 Drawing Sheets

(56) References Cited

U.S. PATENT DOCUMENTS

2015/0151615 A1\* 6/2015 Urabe .................... B60J 5/0444
296/146.6

\* cited by examiner

DOOR BEAM FOR VEHICLE

CROSS-REFERENCE(S) TO RELATED APPLICATIONS

The present application claims priority to Indian Patent Application No. 201711034790, filed on Sep. 29, 2017, the entire contents of which is incorporated herein for all purposes by this reference.

BACKGROUND OF THE INVENTION

Field of the Invention

The present invention relates to a door beam for a vehicle. More particularly, the present invention relates to a door beam for a vehicle which is configured for improving shock-absorbing performance of a door during a side collision.

Description of Related Art

Generally, an external panel, which is formed as a thin plate manufactured by a press and disposed at an external, and an internal panel, which is disposed at an internal, are coupled by use of spot welding, manufacturing a door of a vehicle. In addition, a region is formed between the external panel and the internal panel wherein a door window, a lock, and the like can be provided. Further, a door of a vehicle, in which knobs are respectively disposed on an external surface of the external panel and the internal panel, is rotatably mounted to a vehicle body.

Reinforcement members are disposed to the door for ensuring rigidity in a collision of a vehicle. A door beam is a reinforcement member which is mounted in the door to ensure rigidity in a side collision of a vehicle. In addition, the door beam is called "side beam" because of extending along a longitudinal direction of a vehicle body.

However, there may be a limit to a design of the door beam for ensuring rigidity as there exists a limited region between the external panel and the internal panel of the door to dispose the door beam. In addition, when rigidity of the door which is positioned near a passenger is not ensured, direct cause of inflicting an injury on an passenger when a collision of a vehicle may be occurred.

The information disclosed in the present Background of the Invention section is only for enhancement of understanding of the general background of the invention and should not be taken as an acknowledgement or any form of suggestion that the present information forms the prior art already known to a person skilled in the art.

BRIEF SUMMARY

Various aspects of the present invention are directed to providing a door beam for a vehicle having advantages of improving a shock-absorbing performance in a side collision and requiring a same region for mounting in comparison with a conventional product.

A door beam for a vehicle according to an exemplary embodiment of the present invention may be a door beam which is mounted in a door of a vehicle The door beam for a vehicle may include a beam portion having a rod shape which extends along a longitudinal direction of a vehicle body, a front mounting portion disposed at a front end portion of the beam portion to mount the front end portion of the beam portion to the door, and a rear mounting portion disposed at a rear end portion of the beam portion to mount the rear end portion of the beam portion to the door.

The beam portion may be formed in a hollow cylindrical shape.

The front mounting portion and the rear mounting portion may be brackets.

The front mounting portion and the rear mounting portion may mount the front end portion and the rear end portion of the beam portion to an external panel of the door.

The beam portion may have a shape including a coil spring, as a coil line is repeatedly wound to form a plurality of circular shapes and the plurality of circular shapes are overlapped with each other.

One end portion of the coil line may be connected from the front end portion of the beam portion to the door to be fixed, and the other end portion of the coil line may be connected from the rear end portion of the beam portion to the door to be fixed.

A cross section of the coil line may be formed in a circular shape.

A distance between a center of a circle of the beam portion and an external circumference of the plurality of circular shapes may be longer than a distance between the center of the circle of the beam portion and an internal circumference of the plurality of circular shapes as a thickness of the coil line, and a radius of a circle which is formed by contacting the repeatedly wound coil lines with each other may be longer than the distance between the center of the circle of the beam portion and the internal circumference of the plurality of circular shapes as a half thickness of the coil line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
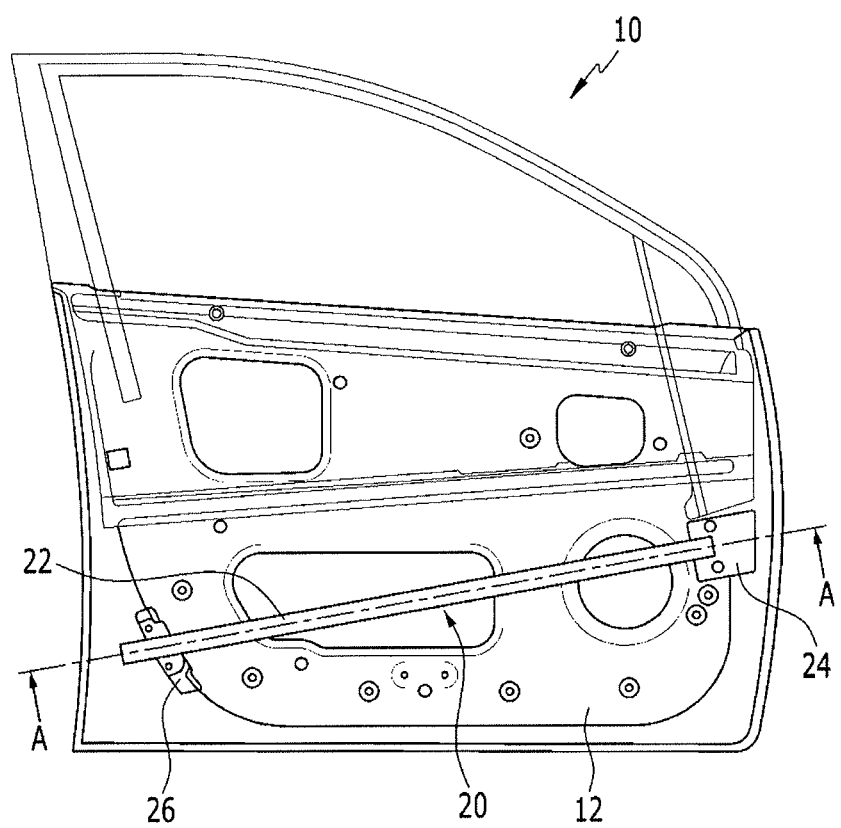
FIG. 1 is a schematic diagram of a door to which a door beam for a vehicle according to an exemplary embodiment of the present invention is mounted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiment embodiments, but also various alternatives, modifications, equivalents and other embodiments, which may be included within the spirit and scope of the invention as defined by the appended claims.

Figure 2:
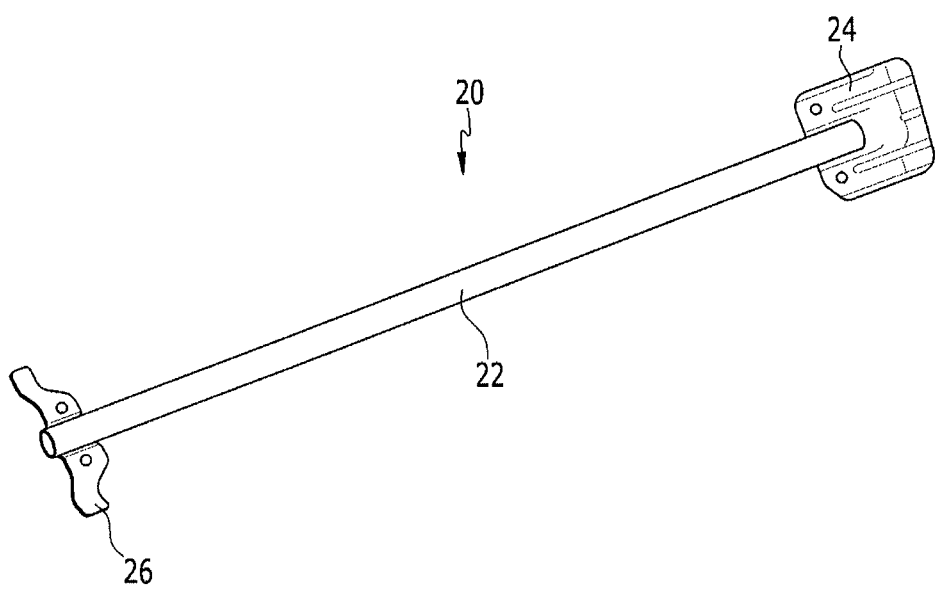
FIG. 2 is a perspective view of a door beam for a vehicle according to an exemplary embodiment of the present invention.

FIG. 1 is a schematic diagram of a door to which a door beam for a vehicle according to an exemplary embodiment of the present invention is mounted, and FIG. 2 is a perspective view of a door beam for a vehicle according to an exemplary embodiment of the present invention.

As shown in FIG. 1 and FIG. 2, a door beam for a vehicle 20 according to an exemplary embodiment of the present invention is mounted in an external panel 12 of a door 10 and is configured to include a beam portion 22, a front mounting portion 24, and a rear mounting portion 26. A front door 10, which is disposed at a driver's seat or a front passenger seat, of doors for a vehicle is illustrated in FIG. 1, and it is desirable that a door beam for a vehicle 20 is mounted to the front door 10, but is not limited thereto.

The beam portion 22 has a set length to be mounted in the door 10 and has a rod shape which extends along a longitudinal direction of a vehicle body.

The front mounting portion 24 is disposed at a front end portion of the beam portion 22. In addition, the front mounting portion 24 functions as a bracket for mounting the front end portion of the beam portion 22 to the external panel 12.

The rear mounting portion 26 is disposed at a rear end portion of the beam portion 22. In addition, the rear mounting portion 26 functions as a bracket for mounting the rear end portion of the beam portion 22 to the external panel 12.

Figure 3:
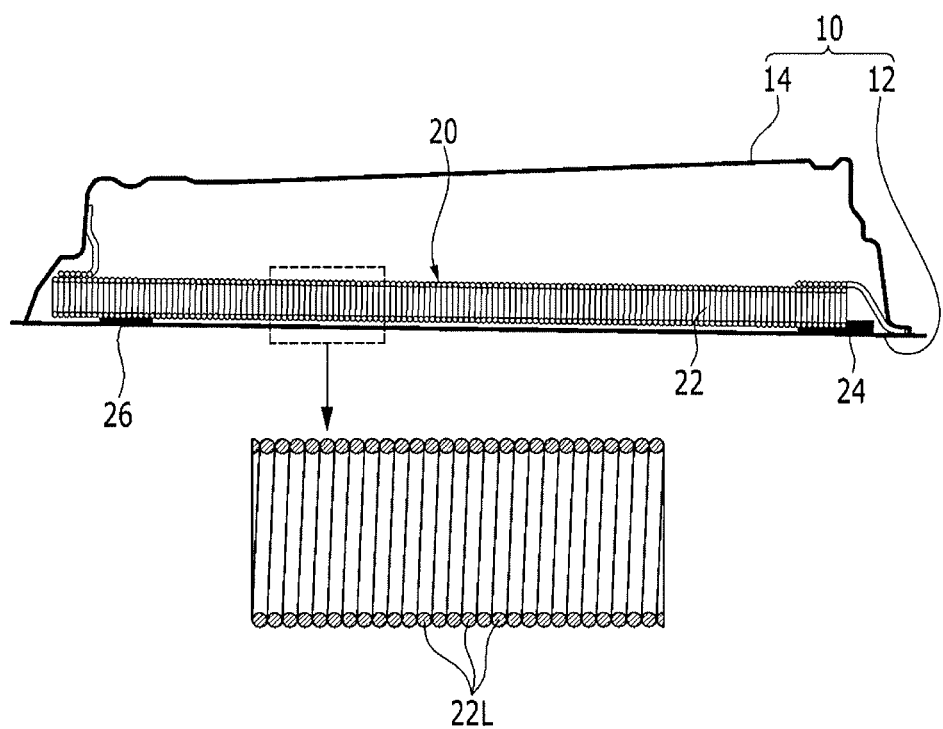
FIG. 3 is a cross-sectional view taken along a line A-A in FIG. 1.
Figure 4:
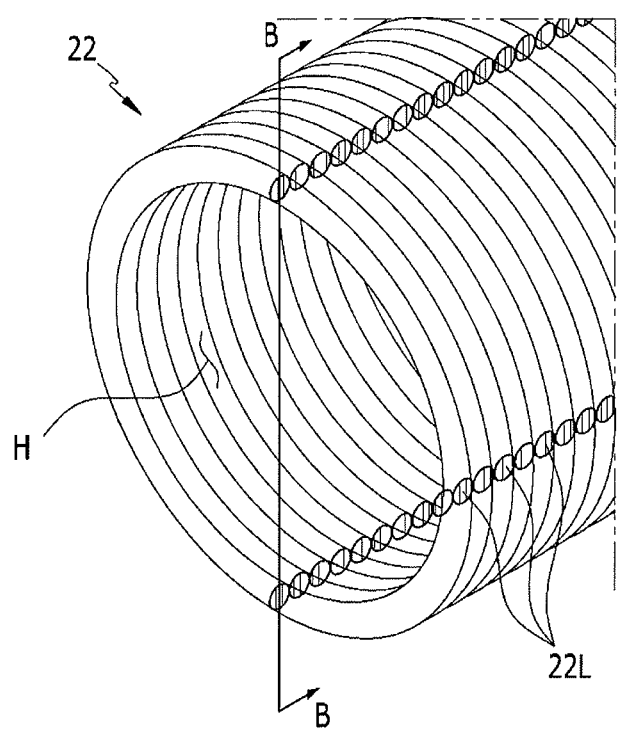
FIG. 4 is a transparent perspective view illustrating a portion of a door beam for a vehicle according to an exemplary embodiment of the present invention.

FIG. 3 is a cross-sectional view taken along a line A-A in FIG. 1, and FIG. 4 is a transparent perspective view illustrating a portion of a door beam for a vehicle according to an exemplary embodiment of the present invention.

As shown in FIG. 3 and FIG. 4, a door beam for a vehicle 20 according to an exemplary embodiment of the present invention is disposed between the external panel 12 and the internal panel 14 of the door 10, and the beam portion 22 formed in the rod shape has a hollow cylindrical shape.

The beam portion 22 may be a coil spring that a coil line 22L is repeatedly wound to form a plurality of circular shapes, and the plurality of circular shapes are overlapped with each other or are formed in a shape including a coil spring. That is, a hollow 'H' is formed internally with respect to a radial direction of the overlapped plurality of circular shapes. Therefore, a weight may be greatly decreased in comparison with a beam having a rod shape in which a hollow is not formed, and shock-absorbing performance can be improved by the elasticity and restoring force of an element including a coil spring. Meanwhile, when the door beam 20 is mounted to the front door 10, the door beam 20 is configured to reduce a load transferred to a vehicle body including a center pillar when a head-on collision occurs, and when the door beam 20 is mounted to a rear door 10, the door beam 20 is configured to reduce the load transferred to a vehicle body including a center pillar when a rear impact occurs. Herein, the front door, the center pillar, and the rear door are well-known to a person of an ordinary skill in the art, so detailed descriptions thereof will be omitted.

One end portion of the coil line 22L may be fixed by being connected from the front end portion of the beam portion 22 to the external panel 12 or the internal panel 14. In addition, the other end portion of the coil line 22L may be fixed by being connected from the rear end portion of the beam portion 22 to the external panel 12 or the internal panel 14. Therefore, the load transferred to the coil line 22L may be absorbed by the external panel 12 or the internal panel 14 through both the end portions of the beam portion 22, or the load transferred to the external panel 12 or the internal panel 14 may be absorbed by the coil line 22L through both the end portions of the beam portion 22.

Figure 5:
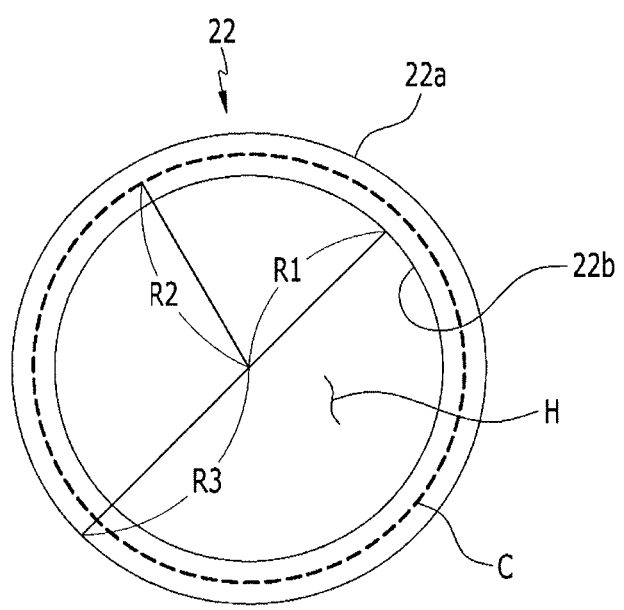
FIG. 5 is a drawing shown from a line B-B in FIG. 4.

FIG. 5 is a drawing shown from line B-B in FIG. 4.

As shown in FIG. 5, an external circumference of the circular shapes formed by winding the coil line 22L is defined to an external circumference 22a of the beam portion 22 and an internal circumference of the circular shapes formed by winding the coil line 22L is defined to an internal circumference 22b of the beam portion 22, and in the present regard, an external radius R3, which is a distance between a center of the circle of the beam portion 22 having the hollow cylindrical shape and the external circumference 22a, is longer than an internal radius R1, which is a distance between the center of the circle of the beam portion 22 having the hollow cylindrical shape and the internal circumference 22b, as a thickness of the coil line 22L. In addition, a middle radius R2, which is a radius of a middle circle C formed by a portion that one coil line 22L forming one circle wherein the external circumference 22a and the internal circumference 22b are formed and the other one coil line 22L forming the other one circle near the one coil line 22L are contacted to each other, is longer than the internal radius R1 as a half thickness of the coil line 22L. That is, a cross section of the coil line 22L is formed in a circular shape.

Weight can be decreased and cost can be reduced according to the beam portion 22 having a composition including a coil spring, and simultaneously, having a hollow cylindrical shape depending on the shape forming the middle circle C in comparison with any member simply having an uniform thickness as a difference from an internal diameter to an external diameter and having a hollow cylindrical shape.

According to an exemplary embodiment of the present invention, rigidity during a broadside collision of a vehicle can be ensured and a weight may be decreased. In addition, shock-absorbing performance may be improved wherein the load transferred to a vehicle body including a center pillar is reduced on a head-on collision of a vehicle. Further, an injury of a passenger may be minimized during a collision of a vehicle.

For convenience in explanation and accurate definition in the appended claims, the terms "upper", "lower", "up", "down", "upwards", "downwards", "internal", "outer", "inside", "outside", "inwardly", "outwardly", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door beam structure for a vehicle wherein the door beam is mounted in a door of a vehicle, the door beam comprising:
    a beam portion having a rod shape which extends along a longitudinal direction of a vehicle body;
    a front mounting portion disposed at a front end portion of the beam portion to mount the front end portion of the beam portion to the door; and
    a rear mounting portion disposed at a rear end portion of the beam portion to mount the rear end portion of the beam portion to the door,
    wherein the beam portion is formed in a hollow cylindrical shape,
    wherein the beam portion has a shape including a coil spring, when a coil line is repeatedly wound to form a plurality of circular shapes and the plurality of circular shapes are overlapped with each other, and
    wherein a first end portion of the coil line is directly connected from the front end portion of the beam portion to the front mounting portion to be fixed to the door and a second end portion of the coil line is directly connected from the rear end portion of the beam portion to the rear mounting portion to be fixed to the door.

2. The door beam structure of claim 1, wherein the front mounting portion and the rear mounting portion are brackets.

3. The door beam structure of claim 1, wherein the front mounting portion and the rear mounting portion mount the front end portion and the rear end portion of the beam portion to an external panel of the door.

4. The door beam structure of claim 1, wherein a cross section of the coil line is formed in a circular shape.

5. The door beam structure of claim 4, wherein a distance between a center of a circle of the beam portion and an external circumference of the plurality of circular shapes is longer than a distance between the center of the circle of the beam portion and an internal circumference of the plurality of circular shapes in a thickness of the coil line, and a radius of a circle which is formed by contacting the repeatedly wound coil lines with each other is longer than the distance between the center of the circle of the beam portion and the internal circumference of the plurality of circular shapes in a half thickness of the coil line.

* * * * *